(12) United States Patent
Ramakrishnan

(10) Patent No.: US 9,660,922 B2
(45) Date of Patent: May 23, 2017

(54) NETWORK ASSISTED RATE SHIFTING FOR ADAPTIVE BIT RATE STREAMING

(75) Inventor: Sangeeta Ramakrishnan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 993 days.

(21) Appl. No.: 13/428,636

(22) Filed: Mar. 23, 2012

(65) Prior Publication Data

US 2013/0254341 A1   Sep. 26, 2013

(51) Int. Cl.
G06F 15/16   (2006.01)
H04L 12/825   (2013.01)
H04L 29/06   (2006.01)
H04N 21/2343   (2011.01)
H04N 21/24   (2011.01)
H04N 21/2662   (2011.01)

(52) U.S. Cl.
CPC .......... *H04L 47/25* (2013.01); *H04L 65/4084* (2013.01); *H04L 65/605* (2013.01); *H04L 65/80* (2013.01); *H04N 21/23439* (2013.01); *H04N 21/2402* (2013.01); *H04N 21/2662* (2013.01)

(58) Field of Classification Search
CPC ..... H04L 47/25; H04L 65/80; H04L 65/4084; H04L 65/605; H04N 21/23439; H04N 21/2402; H04N 21/2662
USPC ........................................................ 709/219
See application file for complete search history.

(56) References Cited

U.S. PATENT DOCUMENTS

| 7,292,602 B1 | 11/2007 | Liu et al. |
| 2005/0233728 A1* | 10/2005 | Karaoguz et al. ............ 455/406 |
| 2005/0248652 A1 | 11/2005 | Firestone et al. |
| 2007/0156924 A1 | 7/2007 | Ramalingam et al. |
| 2010/0299552 A1* | 11/2010 | Schlack .................. H04L 47/10 714/4.1 |
| 2011/0082946 A1* | 4/2011 | Gopalakrishnan .. H04L 65/4084 709/231 |
| 2011/0122939 A1* | 5/2011 | Ganesan et al. ......... 375/240.01 |
| 2011/0126248 A1* | 5/2011 | Fisher ................ H04N 7/17318 725/95 |
| 2011/0299586 A1* | 12/2011 | Odlund et al. ........... 375/240.01 |
| 2012/0108250 A1* | 5/2012 | Ahn et al. ..................... 455/450 |

(Continued)

OTHER PUBLICATIONS

U.S. Appl. No. 13/099,934, filed May 3, 2011. entitled "Reducing Fetching Load on Cache Servers in Adaptive Streaming."

*Primary Examiner* — Arvin Eskandarnia
*Assistant Examiner* — Juan C Turriate Gastulo
(74) *Attorney, Agent, or Firm* — Edell, Shapiro & Finnan, LLC

(57) ABSTRACT

Techniques are provided for adjusting or modifying content request messages in a video streaming environment. An aggregation device is configured to receive a content request message from a client device. The content request message has a request for a first content file of a video stream of a content file type with a first bit rate. The aggregation device determines the first bit rate. The aggregation device then accesses a database that stores a plurality of content files of the content file type at a corresponding plurality of bit rates and determines all available bit rates of the content file type. Network conditions are analyzed for client devices to determine whether the content request message should be adjusted to request a second content file with a second bit rate that is lower than the first bit rate.

27 Claims, 5 Drawing Sheets

(56) References Cited

U.S. PATENT DOCUMENTS

| | | | |
|---|---|---|---|
| 2012/0124179 A1* | 5/2012 | Cappio | H04L 65/104 709/219 |
| 2012/0254455 A1* | 10/2012 | Adimatyam et al. | 709/231 |
| 2012/0265856 A1* | 10/2012 | Major et al. | 709/219 |
| 2012/0314718 A1* | 12/2012 | Strasman et al. | 370/468 |
| 2013/0007831 A1* | 1/2013 | Wu | H04N 21/23655 725/116 |
| 2013/0091249 A1* | 4/2013 | McHugh et al. | 709/219 |
| 2013/0242185 A1* | 9/2013 | Roth et al. | 348/441 |
| 2014/0149557 A1* | 5/2014 | Lohmar | H04L 65/605 709/219 |

* cited by examiner

NETWORK ASSISTED RATE SHIFTING FOR ADAPTIVE BIT RATE STREAMING

TECHNICAL FIELD

The present disclosure relates to bit rate streaming for video content.

BACKGROUND

Adaptive bit rate streaming is a technique in which the bit rate of a video stream is adjusted depending on the available bandwidth of a network over which the video stream is transmitted. A client device in a network can determine what bit rate streams to request based on its view of network availability. Client devices with enhanced processing capabilities may request relatively high bit rate streams, while client devices with reduced processing capabilities may request relatively low bit rate streams. High bit rate streams may generally reduce the available bandwidth of the network.

DESCRIPTION OF EXAMPLE EMBODIMENTS

Overview

Techniques are provided for adjusting or modifying content request messages in a video streaming environment. An aggregation device is configured to receive a content request message from a client device in communication with the aggregation device over a network comprising a plurality of client devices. The content request message includes a request for a first content file of a video stream of a content file type with a first bit rate. The aggregation device evaluates the content request message to determine the first bit rate of the first content file. The aggregation device then accesses a database that stores a plurality of content files of the content file type at a corresponding plurality of bit rates to determine all available bit rates of the content files for the content file type. Network conditions are analyzed for the plurality of client devices to determine whether the content request message should be adjusted to request a second content file associated with the content file type with a second bit rate that is lower than the first bit rate. If so, the aggregation device adjusts the content request message to request the content file type at the second bit rate based on the analysis.

Example Embodiments

Figure 1:
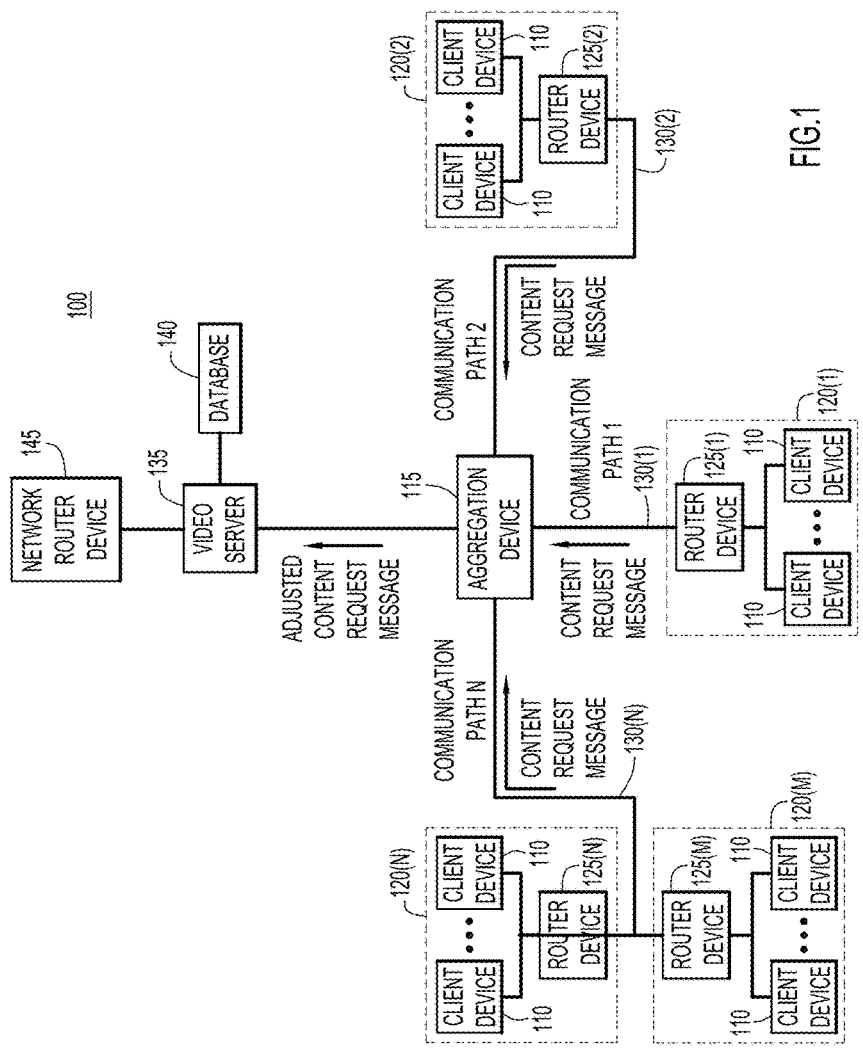
FIG. 1 shows an example network featuring a plurality of client devices in communication with an aggregation device that is configured to obtain content files and to send content files at appropriate bit rates to the client devices.

FIG. 1 shows an example network 100 featuring a plurality of client devices configured to communicate with an aggregation device. The plurality of client devices are shown at 110 and the aggregation device is shown at reference numeral 115. The client devices 110 may be grouped together to form clusters of client devices. For example, clusters of client devices are shown at reference numerals 120(1), 120(2), 120(M), and 120(N). For example, the clusters of client devices 120(1)-120(N) may each represent a household or business enterprise having cluster of client devices. It should be appreciated that any number of clusters comprising any number of client devices may be present in the network 100. Each of the clusters 120(1)-120(N) has a router device, which is shown at reference numerals 125(1)-125(N) for respective clusters 120(1)-120(N). Each of the router devices 125(1)-125(N) services respective client devices within a cluster to enable communications between the client devices 110 and the aggregation device 115. For example, client devices in cluster 120(1) communicate with the aggregation device 115 via the router device 125(1), client devices in cluster 120(2) communicate with the aggregation device 115 via the router device 125(2), and so on.

The client devices 110 may be any type of device configured to receive content files of video streams and to send content request messages in the network 100. For example, the client devices 110 may be any one or combination of a laptop computer, mobile wireless device (e.g., Smartphone), tablet computing device, desktop computer, television, cable box device, video access equipment, etc. Additionally, the client devices 110 may be configured with one or more modem units or other network interface units configured to send content request messages and to receive content files associated with video streams. The aggregation device 115 may be any device that is configured to provide content files of video streams to multiple client devices 110 and to aggregate and adjust (e.g., "adapt") bit rate streams of content files corresponding to video streams of content file types (e.g., a sporting event, news broadcast, television program, etc.), as described herein. In one example, the aggregation device 115 may be a Cable Modem Termination System (CMTS) device or any other similar device.

The aggregation device 115 communicates with the client devices 110 (via the router devices 125(1)-125(N)) across respective communication paths between the aggregation device 115 and the router devices 125(1)-125(N). For example, FIG. 1 shows, at reference numerals 130(1)-130(N), a plurality of communication paths between the aggregation device 115 and the router devices 125(1)-125(N). These communication paths may comprise any type of communication path that is configured or suitable to transmit content files of video streams and content request messages may be used. For example, the communication paths may be hybrid fiber coax (HFC) communication paths or any type of fiber optic communication path. For simplicity, the paths 130(1)-130(N) are referred to generally as communication paths or links herein.

The communication paths couple the aggregation device 115 to the plurality of router devices 125(1)-125(N). Thus, the aggregation device 115 can communicate with each of the clusters 120(1)-120(N) of the client devices 110 via the respective routers 125(1)-125(N). Each of the communication paths may be configured to couple many router devices to the aggregation device 115 or may be configured to couple an individual router device to the aggregation device. For example, in FIG. 1, communication path 1, shown at reference 130(1), couples a first router device 125(1) to the aggregation device 115, while communication path N, shown at reference 130(N), couples two router devices 125(M) and 125(N) to the aggregation device 115. As a result, the aggregation device 115 may communicate with an individual cluster across a single communication path or may communicate with groups of clusters across a single communication path. It should be appreciated that any number of router devices and any number of clusters may share a communication path.

Additionally, the aggregation device 115 can analyze and monitor network conditions of the network 100 to evaluate whether and how the network conditions change based on communications with the client devices 110.

The aggregation device 115 is also coupled to a video server, shown at reference numeral 135. The video server 135 is configured to manage content files and manifest files of video stream data of particular content file types and to broadcast content files to the client devices 110 at appropriate bit rates, according to the techniques described herein. The video server 135 is also configured to store the content files and manifest files in a database 140. It should be appreciated that the database 140 may be part of the video server 135, though FIG. 1 shows the video server 135 and the database 140 as independent entities.

In general, the video server 135 can access the database 140. The video server 135 can access the database 140 to deliver stored content files of video stream data of particular content file types at appropriate bit rates to the client devices 110, as described herein. The video server 135 can also access the database 140 to deliver manifest files, comprising lists of available content files, to particular client devices 110, as described herein. The video server 135 is also coupled to a network router device 145, which is configured to deliver or send content files associated with video streams of content file types at various bit rates to the video server 135. For example, the router device 145 may be configured to access a network or cloud (not shown) to receive content files of video streams for ultimate storage in the database 140 of the video server 135.

The client devices 110 can request content files from the video server 135. For example, as shown in FIG. 1, any one of the client devices 110 may send one or more a content request messages to the video server 135, and a corresponding one of the router devices 125(1)-125(N) in its cluster, receives the content request messages by virtue or residing between the client devices 110 and the video server 135. Similarly, the aggregation device 115 receives the content request messages by virtue of residing between the corresponding router device and the video server 135. In other words, since the aggregation device 115 resides between the router devices 125(1)-125(N) and the video server 135, the aggregation device 115 can intercept and receive the content request messages from the router devices 125(1)-125(N) and destined for the video server 135. The aggregation device 115 can then adjust the content request messages based on network condition information about the network 100 that the aggregation device 115 gathers, analyzes and evaluates, as described herein. The adjusted content request messages are then sent to the video server 135.

Upon receiving the adjusted content request messages, the video server 135 accesses the database 140 to retrieve appropriate content files at appropriate bit rates corresponding to the content files requested in the adjusted content request messages. These retrieved content files are then sent to the requesting client devices via the aggregation device 115 and appropriate ones of the router devices 125(1)-125(N). Additionally, at the instruction of the aggregation device 115, the video server 135 can adjust manifest files associated with the requesting client device. In general, as described herein, the database 140 can store one or more manifest files corresponding to each client device. The aggregation device 115 can modify the manifest files in real time to reflect a smaller list of content choices than those contained in original manifest files. As network bandwidth availability varies, the aggregation device can modify the manifest files to limit or "prune down" the list or to restore the manifest files back to the original lists.

These manifest files may comprise a list of content files that are "available" for the client device to request. The manifest files associated with each client device provide the corresponding client device with a list of available content files which it can request, much like a restaurant menu provides a customer with a list of food options. Thus, since the content file is no longer in the list of accessible content files containing within the manifest file (or analogously, the removed content file is no longer "on the menu"), the client device cannot make a future request for that content file.

Figure 2:
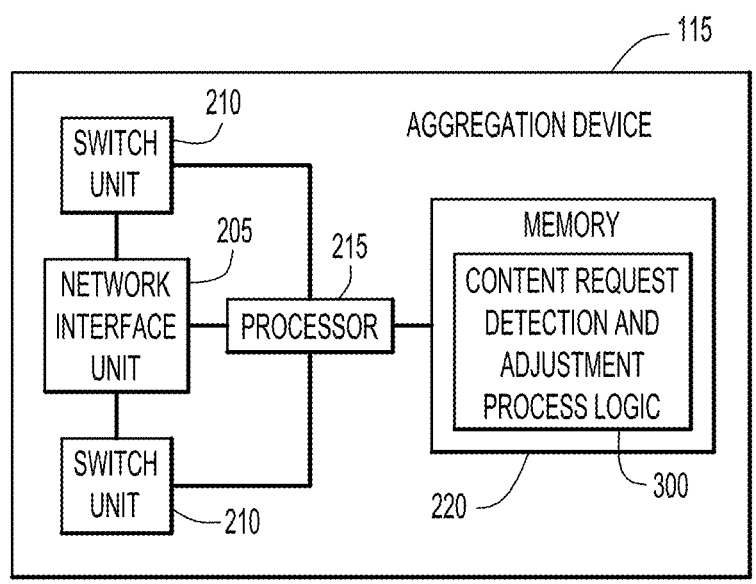
FIG. 2 is an example of a block diagram of the aggregation device configured to evaluate the network conditions and adjust content request messages from the client devices to request content files with appropriate bit rates.

Turning to FIG. 2, an example of a block diagram of the aggregation device 115 is shown. The aggregation device 115 comprises a network interface unit 205, a plurality of switch units 210, a processor 215, and a memory 220. The network interface unit 205 is coupled to the processor 215 and is configured to enable network communications between the aggregation device 115 and the client devices 110 (via corresponding router devices 125(1)-125(N)) and to enable communications between the aggregation device 115 and the video server 135. For example, the network interface unit 205 is configured to receive content request messages from the routers 125(1)-125(N) (originating from the client devices 110) and is configured to send adjusted content request messages to the video server 135. Similarly, the network interface unit 205 is configured to receive content files of video streams from the video server 135 and is configured to send content files of video streams to the client devices 110 via the routers 125(1)-125(N).

The switch units 210 are coupled to the network interface unit 205 and the processor 215 and are configured to enable network communications across multiple communication paths between the aggregation device 115 and the routers 125(1)-125(N). The processor 215 is a microprocessor or microcontroller that is configured to execute program logic instructions (i.e., software) for carrying out various operations and tasks described herein. For example, the processor 215 is configured to execute content request detection and adjustment process logic 300 that is stored in the memory 220 to provide content files to the client devices 110 at appropriate bit rates. The memory 220 may comprise read only memory (ROM), random access memory (RAM), magnetic disk storage media devices, optical storage media devices, flash memory devices, electrical, optical or other physical/tangible memory storage devices.

The functions of the processor 215 may be implemented by logic encoded in one or more tangible (non-transitory) computer readable storage media (e.g., embedded logic such as an application specific integrated circuit, digital signal processor instructions, software that is executed by a processor, etc.), wherein the memory 220 stores data used for the operations described herein and stores software or processor executable instructions that are executed to carry out the operations described herein.

The content request detection and adjustment process logic 300 may take any of a variety of forms, so as to be encoded in one or more tangible computer readable memory media or storage device for execution, such as fixed logic or programmable logic (e.g., software/computer instructions executed by a processor), and the processor 215 may be an application specific integrated circuit (ASIC) that comprises fixed digital logic, or a combination thereof.

For example, the processor 215 may be embodied by digital logic gates in a fixed or programmable digital logic integrated circuit, where digital logic gates are configured to perform the content request detection and adjustment process logic 300. The content request detection and adjustment process logic 300 may generally be embodied in one or more computer readable storage media encoded with software comprising computer executable instructions and when the software is executed operable to perform the operations described herein for the process logic 300. The content request detection and adjustment process logic 300 may also be embodied in one or more hardware components (e.g., digital logical gates in a fixed or programmable digital logic integrated circuit) to perform the operations described herein for the process logic 300.

In general, the aggregation device 115 is configured to monitor and analyze various network conditions of the network 100. For example, the aggregation device 115 may monitor network congestion in the network 100 by analyzing bandwidth conditions of the network 100 and comparing these bandwidth conditions to pre-established acceptable bandwidth conditions. Since the aggregation device 115 is able to communicate with the router devices 125(1)-125(N) to service the client devices 110 in clusters 120(1)-120(N), the aggregation device 115 may be aware of the number of active client devices 110 (e.g., client devices in communication with the video server 135) in the network 100. Based on the number of active client devices 110 and the types of communications sent and received by the client devices 110, the aggregation device 115 can monitor and evaluate the overall bandwidth characteristics and other conditions of the network 100. The aggregation device 115 can compare this information to the pre-established acceptable network conditions and can adjust communications between the client devices 110, routers 125(1)-125(N) and video server 135 accordingly, as described herein.

Additionally, the aggregation device 115 may receive policy information from the video server 135, which may detail, for example, priority information for particular types of communications between the video server 135 and the client devices 110. For example, content files associated with video streams of a plurality of content file types (e.g., a sporting event, news broadcast, content of a premium television channel, etc.) may be prioritized based on pre-established criteria. The policy information may require that certain content file types have a higher priority than other content file types based on these criteria. The aggregation device 115, by being aware of the policy information, can adjust content request messages from the client devices 110 to ensure that content files associated with higher priority content file types are delivered at relatively high quality and without delays or interruptions. The aggregation device 115 also can use the policy information to adjust the network resources (e.g., bandwidth) allocated to certain client devices 110. In another example, the aggregation device 115 can use the policy information to adjust both the content request messages from the client devices 110 and to adjust network resources allocated to the client devices 110.

In other words, the aggregation device 115 has an aggregated view of the network 100 and can utilize the network condition information and the policy information that it obtains and analyzes to manage content requests and content file distribution to the video server 135 and the client devices 110, respectively. For example, if the aggregation device 115 analyzes the network conditions and determines that the available bandwidth of the network 100 is less than an available bandwidth threshold, it can adjust content request messages received from the client devices 110 such that content files are delivered to the requesting client devices at lower bit rates than the content files associated with the original request messages. Likewise, if the aggregation device 115 analyzes the network conditions and determines that the available bandwidth of the network 100 is greater than an available bandwidth threshold, the aggregation device 115 can adjust the content request messages received from the client devices 110 such that the content files are delivered to the requesting client devices at higher bit rates than content files associated with the original messages. In this example, the aggregation device 115 may need to evaluate the specific capabilities of the client devices 110 (e.g., via a signaling message sent from the client devices 110 to the aggregation device 115) to ensure that the requesting client device 110 has sufficient capability to manage the higher bit rate content files. These techniques are described herein.

Figure 3:
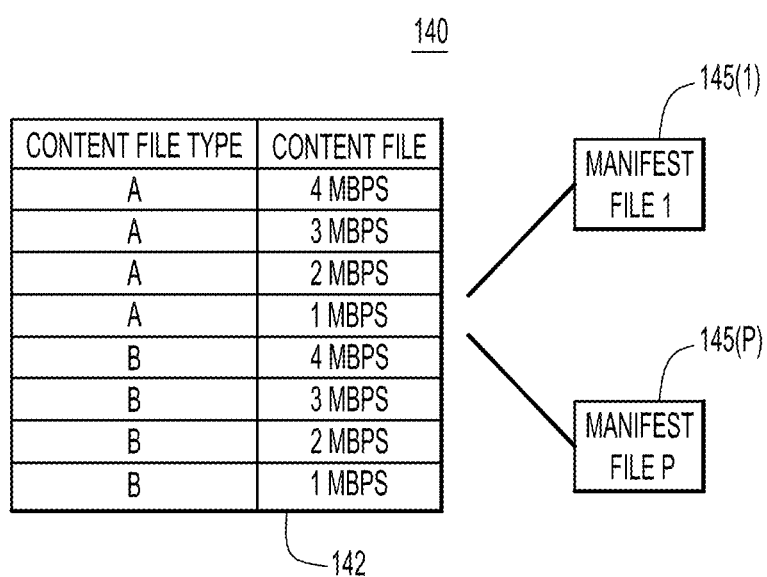
FIG. 3 is an example of a database configured to store multiple content files of a video stream at a corresponding plurality of different bit rates.

Reference is now made to FIG. 3. FIG. 3 shows an example of data entries/list 142 in the database 140. As described above, the video server 135 is configured to store in the database 140 files (e.g., content files) associated with video streams of particular content file types. For example, as shown in FIG. 3, the database 140 shows two different content file types: content file type "A" and content file type "B." The content file types represent particular video content. For example, content file type "A" may represent video content of a sporting event, and content file type "B" may represent a movie or television program of a premium channel.

Each of the content file types in FIG. 3 has multiple content files at a corresponding plurality of bit rates. As shown, for example, the content file type "A" has four associated content files with four bit rates: (1) content file A with a bit rate of four megabits per second, (2) content file A with a bit rate of three megabits per second, (3) content file A with a bit rate of two megabits per second and (4) content file A with a bit rate of one megabit per second. Similarly, content file type "B" also has four associated content files with these four bit rates. Thus, for example, if a client device is requesting video streams for the content file type "A" (e.g., a sporting event), the client device will send content request messages destined for the video server 135 for content files associated with the sporting event. Similarly if a client device 110 is requesting video streams for the content file type "B" (e.g., a premium television program), the client device will send content request messages destined for the video server 135 for content files associated with the premium television program.

The database 140 also stores a plurality of manifest files, shown at reference 145(1)-145(P). Each manifest file may correspond to a client device in the network 100. Likewise, multiple manifest files may correspond to a single client device and a single manifest file may correspond to multiple client devices. The manifest files comprise one or more of the content files shown in list 142. Each of the manifest files indicates to its associated client device the available "options" of content files that the client device is permitted to request from the video server. As described herein, these manifest files can be customized to each client device, and content file entries in each manifest file can be added or deleted as required.

Each of the content files are typically fragments that are a few seconds long (e.g., two to ten seconds) of the video stream of the content file type. For example, the content files may be a two second video fragment of a sporting event associated with content type "A" or may be a two second video fragment of a premium television program associated with content type "B." When a client device receives a content file, it receives the fragment associated with the particular content type at one of the plurality of bit rates. At the end of each fragment (e.g., when the two second video fragment has ended), client devices can request new content files for additional fragments of the content file type at, for example, same or different bit rates from previously received content files. Content files with higher bit rates typically have higher video quality, but are also typically more processing intensive. For example, content files at higher bit rates may be associated with higher quality video streams (e.g., better sharpness, color, sound, etc.) when compared to content files at lower bit rates but also may require more bandwidth than content files at lower bit rates. Thus, when higher bit rate content files are sent to the client devices 110, the available bandwidth of the network 100 maybe lower than when lower bit rate content files are sent to the client devices 110.

A client device may request a content file at a particular bit rate based on its own internal processing capabilities. For example, each of the client devices 110 typically has its own proprietary algorithm that it uses to measure internal processing capabilities. Each of the client devices may use such an algorithm to determine buffer fullness and whether to stay at the same bit rate or whether to up-shift (e.g., make a request for a content file at a higher bit rate) or down-shift (e.g., make a request for a content file at a lower bit rate). The client devices 110 may also use criteria such as processor load to determine the bit rate to be requested. In general, if a client device is capable of enhanced processing or if the client device has a large available processing capabilities, the client device may want to up-shift and accordingly may request a content file (by sending a content request file destined for the video server 135) at a higher bit rate. On the other hand, if a client device has reduced processing capabilities, the client device may want to down-shift and accordingly may request a content file at a lower bit rate.

Though each of the client devices 110 may be capable of analyzing its own processing capabilities, the client devices 110 do not have knowledge of the processing capabilities of other client devices in the network 100. As a result, the client devices 110 may make requests to the video server 135 for content files without regard to overall network conditions or bandwidth constraints of the network 100. As a result, if many of the client devices 110 decide to up-shift and thus request content files at high bit rates based on individual processing capabilities, the available bandwidth in the network 100 may drop to a level below an acceptable available bandwidth threshold for the network 100. This may degrade the quality of the content files, cause delays or disruption in access to the content files and prevent or disrupt transmission of content files associated with high priority content types. In one example, when the network 100 is highly congested (e.g., when the available bandwidth in the network is lower than the threshold), the client devices may suddenly down-shift or abort the current content file fragment being requested. This could result in an end user of the client device having to wait while the client device buffer fills with a new content file fragment, thus delaying or disrupting the video stream to the end user.

The aggregation device 115 is configured to alleviate these problems. In particular, since the aggregation device 115 is configured to monitor network conditions, the aggregation device 115 can modify or adjust the content request messages received from the client devices 110 (via appropriate router devices 125(1)-125(N)) to ensure that the requests are appropriate under the overall network conditions of network 100. In one example, the aggregation device 115 can monitor client requests for content files and can modify or adjust the content request messages by the client devices 110 such that the adjusted content request messages request content files at lower bit rates than originally requested, as the network conditions (e.g., bandwidth requirements) of the network 100 dictate. In this example, the content request messages originating from the client devices 110 may be hypertext transfer protocol (HTTP) request messages (or request messages associated with another protocol) that are pointed to retrieve high bit rate content files from the database 140. The aggregation device 115 may adjust or redirect these requests to retrieve lower bit rate content files from the database 140. Alternatively, the aggregation device 115 might not necessarily adjust or redirect these request messages, but rather, it might send a response message to the requesting client devices 110 with a suggestion for the requesting client devices to send a new request for a content file at a lower bit rate.

In another example, the aggregation device 115 can remove available content files from the manifest files associated with particular client devices 110. In other words, when network conditions dictate that high bit rate content files should not be sent to the client devices 110, the aggregation device 115 can edit the manifest files to remove all of the high bit rate content files from the manifest file corresponding to the client devices 110 that are making the request. Thus, the aggregation device 115 is able to edit or update the manifest files in the database 140 "on the fly," according to the network conditions, and the client devices 110 would not be able to request content files at these high bit rates, since their corresponding manifest files would not list these content files as being available for requesting. If the client devices 110 did request content files at the high bit rates, the aggregation device 115 may send a response message to the requesting client devices 110 with instructions to send another content request message for a lower bit content file.

In another example, the aggregation device 110 may monitor the client devices (e.g., via respective router devices 125(1)-125(N)) to determine whether client devices are attempting to up-shift for content files at higher bit rates than previously requested. For example, if a client device has previously requested content file type "A" at a bit rate of two megabits per second, and later sends a request for a content file associated with content file type "A" at a bit rate of three megabits per second, the aggregation device 115 may adjust the new content file request to correspond to the bit rate of two megabits per second previously requested by the client device. In this example, the aggregation device 115 can prevent a client device from unnecessarily up-shifting while also delivering content files at bit rates to produce the same video quality previously requested by the client device.

The aggregation device 115 may also be aware that certain client devices 110 are requesting content file types at different priority levels based on pre-established network policies. For example, as stated above, one group or cluster of client devices 110 may be requesting video streams (e.g., a sporting event) associated with content file type "A," while another group or cluster of client devices 110 may be requesting video streams (e.g., a premium television program) associated with content file type "B." Based on, for example, the pre-established network policies, the aggregation device 115 may assign a higher priority for content requests for content files associated with content file type "A" and a lower priority for content requests for content files associated with content file type "B". Thus, the aggregation device 115 can adjust the content requests for the content files based on these pre-established network policies. Similarly, the aggregation device 115 may reserve or allocate a predetermined amount of network resources (e.g., bandwidth) for each of the content file types based on these policies or based on the respective priorities assigned to the content file types in accordance with these policies. In this example, if network policies designate the sporting event should receive enhanced network resources (e.g., higher bandwidth allocation) or if the network policies designate the sporting event as having a higher priority than the premium television program, then the content files associated with content file type "A" will be allocated more bandwidth than the content files associated with content file type "B." Thus, client devices requesting content files associated with content file type "A" may be able to request higher bit rate content files than those client device requesting content files associated with content file type "B." The aggregation device 115 can use these policies to adjust the content request messages associated with the client devices, to adjust network resource allocation, or both.

Figure 4:
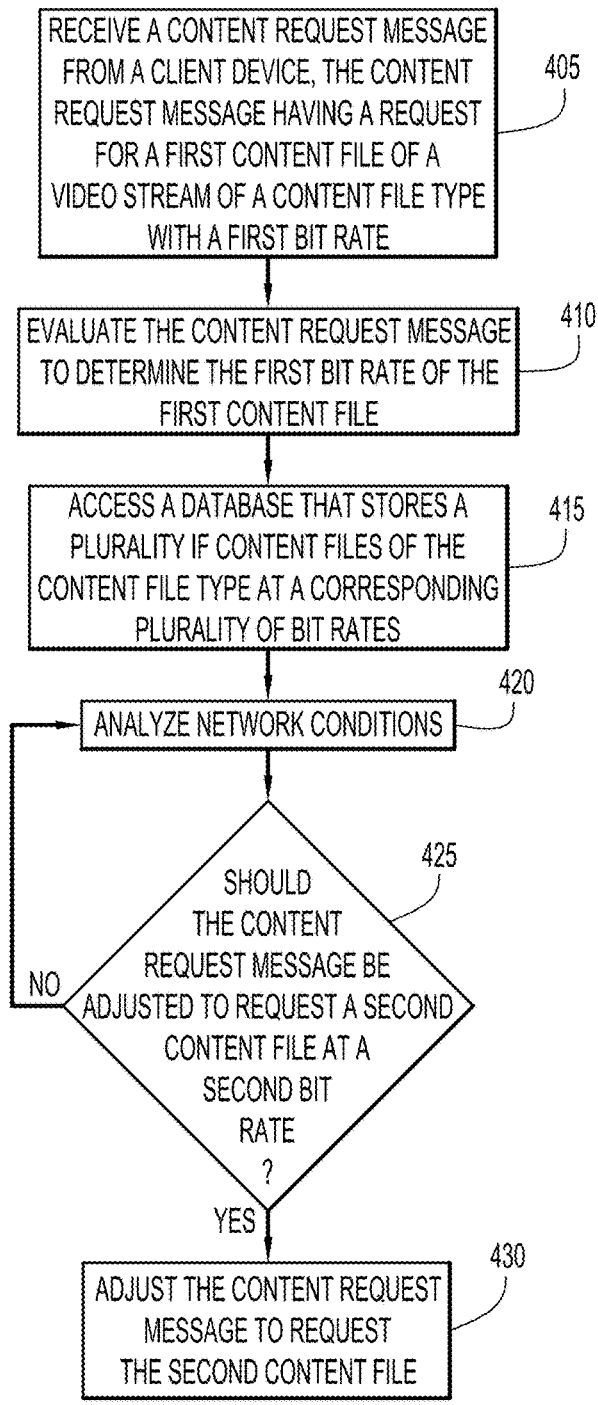
FIG. 4 is a flow chart depicting operations of the aggregation device to adjust the content request message received from one of the client devices to request content files at appropriate bit rates.

Reference is now made to FIG. 4. FIG. 4 shows a flow chart depicting operations of the content request detection and adjustment process logic 300 of aggregation device 115. The process logic 300 enables the aggregation device 115 to adjust a content request message received from one of the client devices such that the content request message contains a request for a content file at an appropriate bit rate based on network conditions. At 405, the processor 215 of the aggregation device 115 receives a content request message from one of the client devices 110. The content request message, for example, is sent from the client device via one of the routing devices 125(1)-125(N) and is ultimately destined for the video server 135. As stated above, the aggregation device 115, by virtue of residing between the client device and the video server 135, intercepts and receives the content request message. The content request message has a request for a first content file of a video stream of a content file type (e.g., content file type "A" or content file type "B," as described above) with a first bit rate associated with the first content file.

At 410, the processor 215 evaluates the content request message to determine the first bit rate of the first content file, and at 415, accesses a database (e.g., database 140) that stores a plurality of content files of the content file type at a corresponding plurality of bit rates. The processor 215 then, at 420, analyzes network conditions, and at 425, determines whether the content request message should be adjusted to request a second content file at a second bit rate that is lower than the first bit rate. The processor 215 makes this determination based on network conditions analyzed in operation 420 and as described above. If the processor 215 determines that the content request message should be adjusted, the processor, at 430, adjusts the content request message to request the second content file for the requesting client device. If the processor 215 determines that the content request message should not be adjusted (i.e., the answer to decision 425 is "no"), the processor 215 reverts to operation 420. Thus, the aggregation device 115 is able to analyze the network conditions of network 100 to determine whether or not the content request message from a requesting client device should be adjusted to request a content file at an appropriate bit rate.

Figure 5:
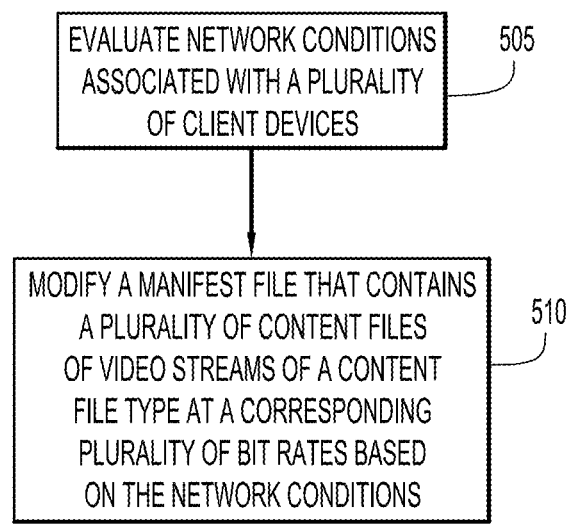
FIG. 5 is a flow chart depicting operations of the aggregation device to modify the database of the multiple content files based on the evaluated network conditions.

Reference is now made to FIG. 5. FIG. 5 shows a flow chart depicting operations of the content request detection and adjustment process logic 300 of the aggregation device 115 to modify the database 140 of the multiple content files based on the evaluated network conditions. At operation 505, the processor 215 evaluates network conditions associated with a plurality of client devices. As stated above, these network conditions may include bandwidth conditions of the network and pre-established network policies. After evaluating the network conditions, the processor 215, at operation 510, modifies a database (e.g., database 140) or a manifest file that stores or contains a plurality of content files of a content file type at a corresponding plurality of bit rates based on the network conditions. For example, as described above, the processor 215 may instruct the video server 135 to remove one or more of the plurality content files from the database based on the evaluated network conditions. Additionally, as described above, if a client device requests, via a content request message, a high bit rate content file that is not in the database (e.g., when the video server, at the instruction of the aggregation device 115, removes the high bit rate content file), the processor 215 of the aggregation device 115 may adjust the content request message to request a second content file associated with the content file type with a second bit rate that is lower than the first bit rate.

It should be appreciated that the techniques described above in connection with all embodiments may be performed by one or more computer readable storage media that is encoded with software comprising computer executable instructions to perform the methods and steps described herein.

In sum, a method is provided comprising: at an aggregation device configured to aggregate adaptive bit rate streams, receiving a content request message from a client device in communication with the aggregation device over a network comprising a plurality of client devices in communication with the aggregation device, the content request message having a request for a first content file of a video stream of a content file type with a first bit rate; evaluating the content request message to determine the first bit rate of the first content file; accessing a database that stores a plurality of content files of the content file type at a corresponding plurality of bit rates to determine all available bit rates of the content files for the content file type; analyzing network conditions to determine whether the content request message should be adjusted to request a second content file associated with the content file type with a second bit rate that is lower than the first bit rate; and adjusting the content request message to request the content file type at the second bit rate based on the analyzing.

In addition, a method is provided comprising: at an aggregation device configured to aggregate adaptive bit rate streams, evaluating network conditions associated with a plurality of client devices in communication with the aggregation device; and modifying a database that stores a plurality of content files of a video stream of a content file type at a corresponding plurality of bit rates based on the network conditions.

Furthermore, one or more computer readable storage media is provided that is encoded with software comprising computer executable instructions and when executed operable to: receive a content request message from a client device in communication with an aggregation device over a network comprising a plurality of client devices in communication with the aggregation device, the content request message having a request for a first content file of a video stream of a content file type with a first bit rate; evaluate the content request message to determine the first bit rate of the first content file; access a database that stores a plurality of content files of the content file type at a corresponding plurality of bit rates to determine all available bit rates of the content files for the content file type; analyze network conditions to determine whether the content request message should be adjusted to request a second content file associated with the content file type with a second bit rate that is lower than the first bit rate; and adjust the content request message to request the content file type at the second bit rate based on the analyzing.

Additionally, one or more computer readable storage media is provided that is encoded with software comprising computer executable instructions and when the software is executed operable to: evaluate network conditions associated with a plurality of client devices in communication with an aggregation device; and modify a database that stores a plurality of content files of a video stream of a content file type at a corresponding plurality of bit rates based on the network conditions.

Furthermore, an apparatus is provided comprising: a network interface unit; one or more switch units coupled to the network interface unit; a memory; and a processor coupled to the network interface unit, one or more switch units and memory and configured to: receive a content request message from a client device, the content request message having a request for a first content file of a video stream of a content file type with a first bit rate; evaluate the content request message to determine the first bit rate of the first content file; access a database that stores a plurality of content files of the content file type at a corresponding plurality of bit rates to determine all available bit rates of the content files for the content file type; analyze network conditions for the plurality of client devices to determine whether the content request message should be adjusted to request a second content file associated with the content file type with a second bit rate that is lower than the first bit rate; and adjust the content request message to request the content file type at the second bit rate based on the analyzing.

In addition, an apparatus is provided comprising: a network interface unit; one or more switch units coupled to the network interface unit; a memory; and a processor coupled to the network interface unit, one or more switch units and memory and configured to: evaluate network conditions associated with a plurality of client devices; and modify a database that stores a plurality of content files of a video stream of a content file type at a corresponding plurality of bit rates based on the network conditions.

The above description is intended by way of example only. Various modifications and structural changes may be made therein without departing from the scope of the concepts described herein and within the scope and range of equivalents of the claims.

What is claimed is:

1. A method comprising:
at an aggregation device residing between a plurality of client devices and a video server and configured to intercept and aggregate adaptive bit rate streams sent by the plurality of client devices towards the video server, receiving a content request message sent by a client device that is in communication with the aggregation device over a network, wherein the content request message includes a request for a first content file of a video stream of a content file type with a first bit rate;
evaluating the content request message to determine the first bit rate of the first content file;
accessing a database that stores a plurality of content files of the content file type at a corresponding plurality of bit rates to determine all available bit rates of the content files for the content file type;
determining, based on bandwidth characteristics of the network, that the content request message should be adjusted to request a second content file associated with the content file type with a second bit rate that is lower than the first bit rate;
in response to the determining, adjusting the content request message received from the client device to generate an adjusted content request message that requests the content file type at the second bit rate, wherein adjusting comprises sending a response message to the client device instructing the client device to send a replacement content request message to request the second content file; and
sending the adjusted content request message from the aggregation device to the video server.

2. The method of claim 1, wherein determining that the content request message should be adjusted comprises comparing network bandwidth conditions determined at the aggregation device to pre-established network policies.

3. The method of claim 2, wherein adjusting the content request message received from the client device comprises adjusting the content request message to request the second content file when an available bandwidth of the network is lower than an available bandwidth threshold.

4. The method of claim 2, further comprising adjusting the content request message to request a third content file type at a third bit rate that his higher than the first bit rate when an available bandwidth of the network is greater than an available bandwidth threshold.

5. The method of claim 1, further comprising:
receiving policy information indicating priority information for different communication types; and
determining, based on bandwidth characteristics of the network and the priority information, that the content request message should be adjusted to request the second content file associated with the content file type with the second bit rate that is lower than the first bit rate.

6. The method of claim 1, wherein adjusting the content request message comprises modifying a hyper text transfer protocol (HTTP) request associated with the content request message to request the second content file.

7. The method of claim 1, wherein the database stores one or more manifest files corresponding to each client and wherein each of the manifest files includes a list of content files available to the corresponding client to request, and further comprising:
based on bandwidth characteristics of the network, modifying the database to remove the first content file from a manifest file associated with the client device that lists available content files for the client device; and instructing the client device to send another content request message to request a content file from the remaining available content files in the manifest file.

8. The method of claim 7, wherein modifying the database further comprises:

removing all files from the manifest file associated with the client device that have a bit rate greater than a predetermined threshold.

9. The method of claim 1, and further comprising reserving a predetermined amount of bandwidth for the client device based on the first bit rate of the first content file and the second bit rate of the second content file.

10. The method of claim 1, wherein adjusting comprises adjusting the content request message based on pre-established network policy information.

11. One or more non-transitory computer readable storage media encoded with software comprising computer executable instructions and when the software is executed operable to:

receive, at an aggregation device residing between a plurality of client devices and a video server and configured to intercept and aggregate adaptive bit rate streams sent by the plurality of client devices towards the video server, a content request message sent from a client device over a network to the video server, wherein the content request message includes a request for a first content file of a video stream of a content file type with a first bit rate;

evaluate the content request message to determine the first bit rate of the first content file;

access a database that stores a plurality of content files of the content file type at a corresponding plurality of bit rates to determine all available bit rates of the content files for the content file type;

determine, based on bandwidth characteristics of the network, that the content request message should be adjusted to request a second content file associated with the content file type with a second bit rate that is lower than the first bit rate;

in response to determining that the content request message should be adjusted, adjust the content request message received from the client device to generate an adjusted content request message that requests the content file type at the second bit rate; and send the adjusted content request message from the aggregation device to the video server;

wherein the instructions operable to adjust the content request message received from the client device comprise instructions operable to:

send to the client device a response message instructing the client device to send a replacement content request message to request the second content file.

12. The non-transitory computer readable storage media of claim 11, wherein the instructions operable to determine that the content request message should be adjusted comprise instructions operable to compare network bandwidth conditions determined at the aggregation device to pre-established network policies.

13. The non-transitory computer readable storage media of claim 12, wherein the instructions operable to adjust the content request message received from the client device comprise instructions operable to adjust the content request message to request the second content file when an available bandwidth of the network is lower than an available bandwidth threshold.

14. The non-transitory computer readable storage media of claim 11, further comprising instructions operable to:

receive policy information indicating priority information for different communication types; and determine, based on bandwidth characteristics of the network and the priority information, that the content request message should be adjusted to request the second content file associated with the content file type with the second bit rate that is lower than the first bit rate.

15. The non-transitory computer readable storage media of claim 11, wherein the database stores one or more manifest files corresponding to each client and wherein each of the manifest files includes a list of content files available to the corresponding client to request, and further comprising instructions operable to:

based on bandwidth characteristics of the network, modify the database to remove the first content file from a manifest file associated with the client device that lists available content files for the client device; and instruct the client device to send another content request message to request a content file from the remaining available content files in the manifest file.

16. An apparatus comprising:

a network interface unit configured to enable communications over a network with a plurality of client devices and a video server;

one or more switch units coupled to the network interface unit; and a processor coupled to the network interface unit and the one or more switch units, and configured to:

receive a content request message sent from a client device to the video server, wherein the content request message includes a request for a first content file of a video stream of a content file type with a first bit rate;

evaluate the content request message to determine the first bit rate of the first content file;

access a database that stores a plurality of content files of the content file type at a corresponding plurality of bit rates to determine all available bit rates of the content files for the content file type;

determine, based on bandwidth characteristics of the network, that the content request message should be adjusted to request a second content file associated with the content file type with a second bit rate that is lower than the first bit rate; and in response to determining that the content request message should be adjusted, adjust the content request message received from the client device to generate an adjusted content request message that requests the content file type at the second bit rate; and send the adjusted content request message from the apparatus to the video server;

wherein to adjust the content request message, the processor is configured to send to the client device a response message instructing the client device to send a replacement content request message to request the second content file.

17. The apparatus of claim 16, wherein to determine that the content request message should be adjusted, the processor is further configured to compare network determine that the content request message should be adjusted conditions including at least one of bandwidth conditions determined at the aggregation device to pre-established network policies.

18. The apparatus of claim 17, wherein the processor is further configured to adjust the content request message to request the second content file when an available bandwidth of the network is lower than an available bandwidth threshold.

19. The apparatus of claim 16, wherein the processor is further configured to:
   receive policy information indicating priority information for different communication types; and
   determine, based on bandwidth characteristics of the network and the priority information, that the content request message should be adjusted to request the second content file associated with the content file type with the second bit rate that is lower than the first bit rate.

20. The apparatus of claim 16, wherein the database stores one or more manifest files corresponding to each client and wherein each of the manifest files includes a list of content files available to the corresponding client to request, and wherein the processor is further configured to:
   based on bandwidth characteristics of the network, modify the database to remove the first content file from the database; and
   instruct the client device to send another content request message to request a content file from the remaining available content files.

21. The apparatus of claim 20, wherein to modify the database the processor is further configured to:
   remove all files from the manifest file associated with the client device that have a bit rate greater than a predetermined threshold.

22. The apparatus of claim 16, wherein to adjust the content request message, the processor is configured to modify a hyper text transfer protocol (HTTP) request associated with the content request message to request the second content file.

23. The non-transitory computer readable storage media of claim 15, wherein the instructions operable to modify the database further comprises instructions operable to:
   remove all files from the manifest file associated with the client device that have a bit rate greater than a predetermined threshold.

24. The non-transitory computer readable storage media of claim 11, wherein the instructions operable to adjust the content request message comprise instructions operable to modify a hyper text transfer protocol (HTTP) request associated with the content request message to request the second content file.

25. The method of claim 1, further comprising monitoring the client devices to determine whether a client device is attempting to up-shift for a content file at a higher bit rate than a bit rate previously requested, and wherein the second bit rate is the bit rate previously requested by the client device.

26. The non-transitory computer readable storage media of claim 11, further comprising instructions operable to monitor the client devices to determine whether a client device is attempting to up-shift for a content file at a higher bit rate than a bit rate previously requested, and wherein the second bit rate is the bit rate previously requested by the client device.

27. The apparatus of claim 16, wherein the processor is configured to monitor the client devices to determine whether a client device is attempting to up-shift for a content file at a higher bit rate than a bit rate previously requested, and wherein the second bit rate is the bit rate previously requested by the client device.

* * * * *